Aug. 20, 1929.  P. SCHWERIN ET AL  1,724,972
GLASS WORKING MACHINE
Filed Aug. 28, 1926   3 Sheets-Sheet 2
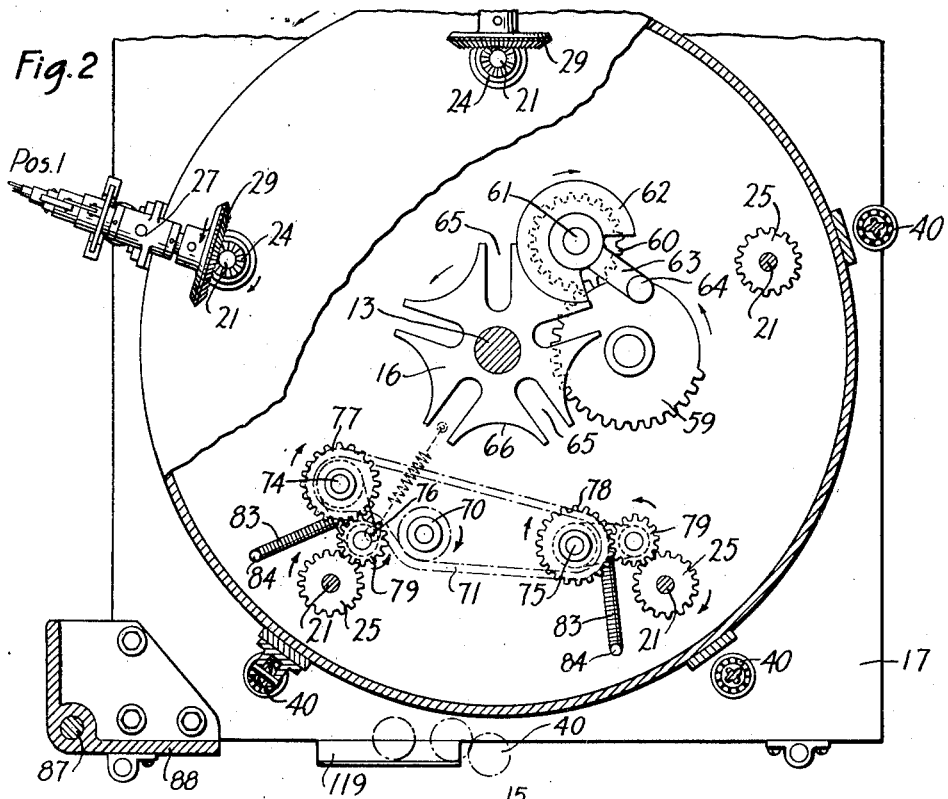
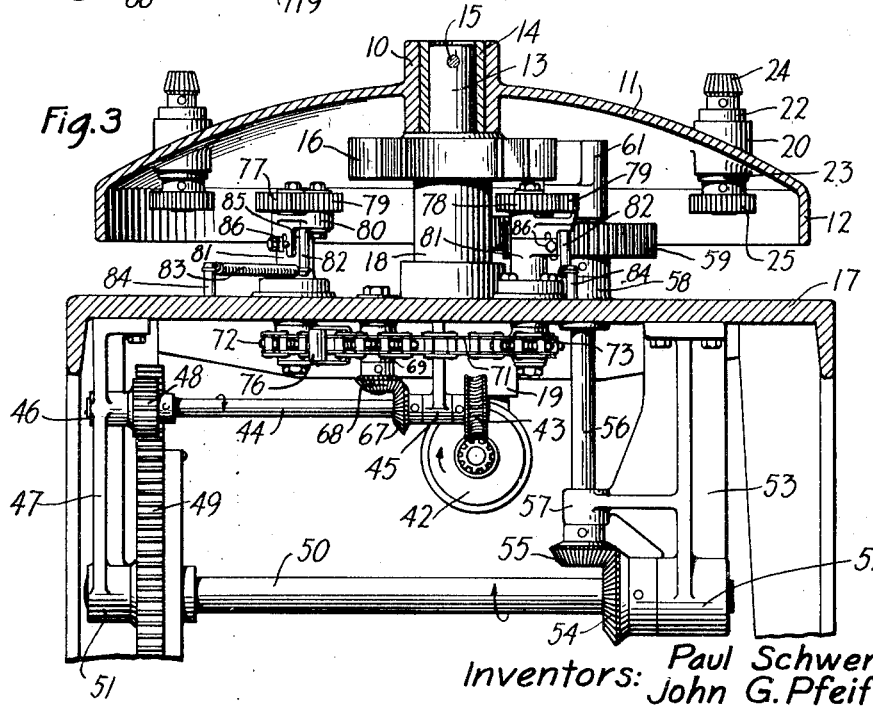
Inventors: Paul Schwerin
John G. Pfeiffer
by Joel C.R. Palmer Att'y.

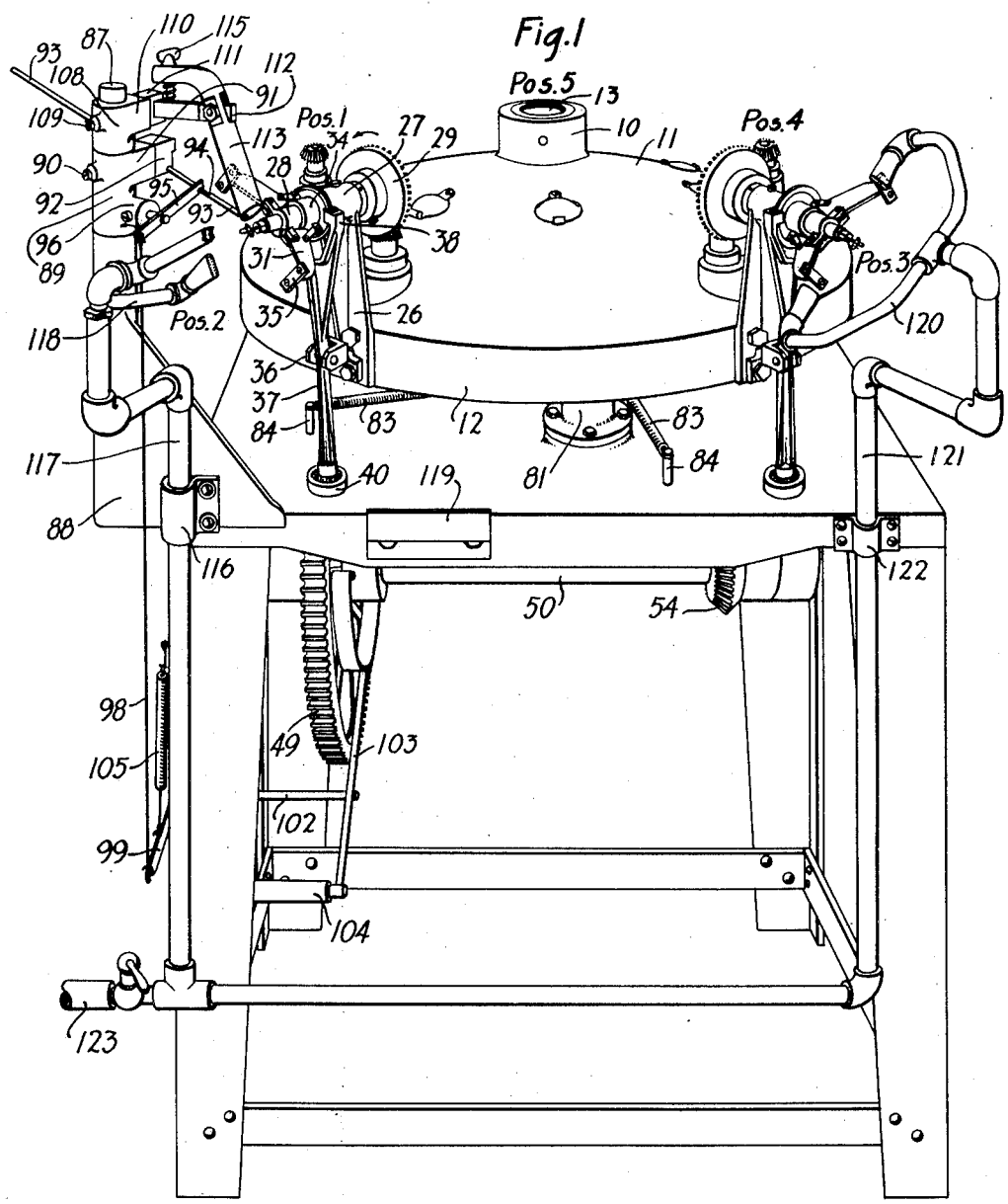

Aug. 20, 1929.   P. SCHWERIN ET AL   1,724,972
GLASS WORKING MACHINE
Filed Aug. 28, 1926   3 Sheets-Sheet 3
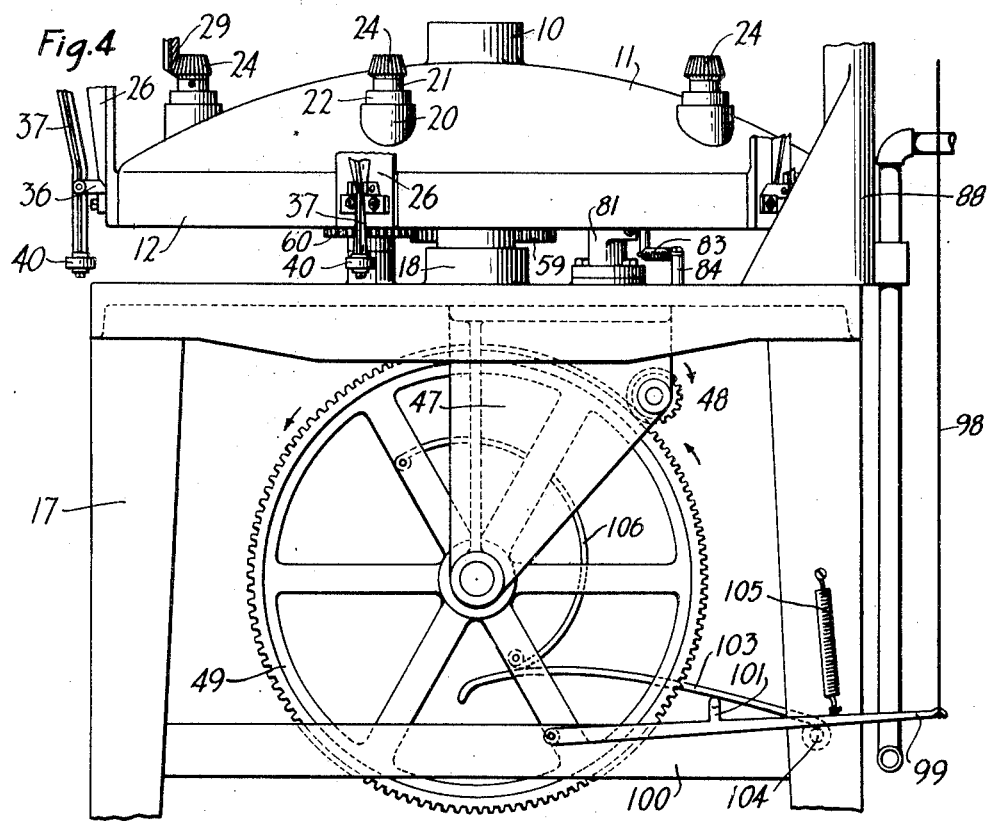
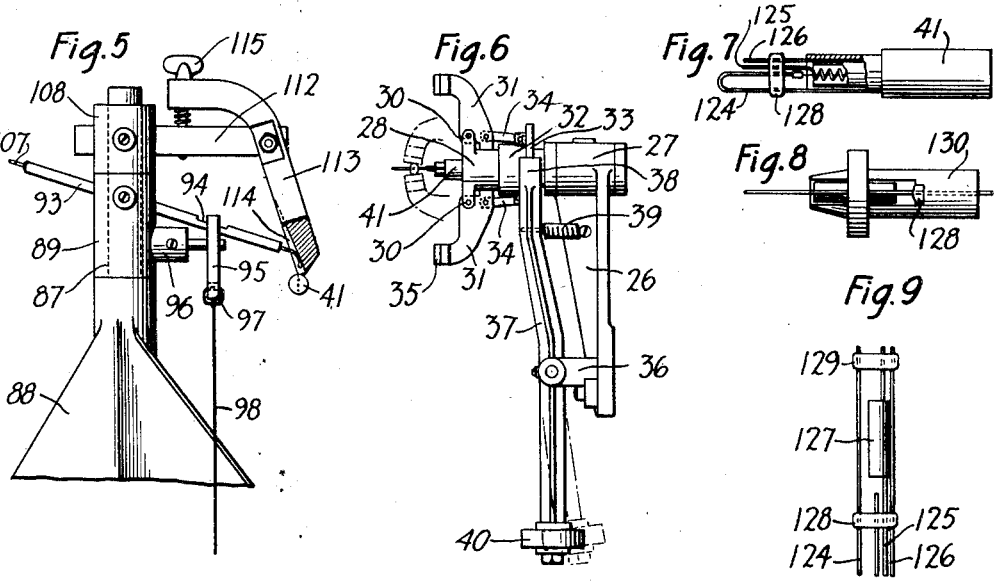
Inventors: Paul Schwerin
John G. Pfeiffer
by Jack A. Palmer, Atty.

Patented Aug. 20, 1929.

1,724,972

UNITED STATES PATENT OFFICE.

PAUL SCHWERIN, OF NEW YORK, N. Y., AND JOHN G. PFEIFFER, OF UNION HILL, NEW JERSEY, ASSIGNORS TO BELL TELEPHONE LABORATORIES, INCORPORATED, OF NEW YORK, N. Y., A CORPORATION OF NEW YORK.

GLASS-WORKING MACHINE.

Application filed August 28, 1926. Serial No. 132,130.

This invention relates to glass working machines and more particularly to such machines used in the manufacture of electron discharge devices.

An object of the invention is to effect automatically the application of vitreous insulating material to wire material.

It is customary practice in the manufacture of small electron discharge devices, to form an elongated glass insulating bead on the supporting wires for the electrodes by inserting the supporting wires in a die with the free ends of the wires projecting therefrom and fusing a plastic bead of glass on the wires near their ends. The elongated beads thus formed are molded around the wires in a glass blower's flame. A rugged assembly of electrodes is produced in which the elements of the structure are properly insulated and accurately spaced in the glass beads. This process requires a highly skilled operator and is relatively slow. Furthermore, the beads vary considerably in size and shape, and the cost, even for quantity production, is relatively high.

These difficulties are overcome in a form of machine embodying this invention in which the bead forming operation is performed automatically and which comprises a stationary frame support which carries an intermittently rotatable drum or carrier having a plurality of distributed drives adjacent the periphery thereof to furnish driving means for the various steps in the operation of the machine. A head is associated with each drive and carries a nest to receive the supporting wires on which the bead is to be formed. A standard supporting a chute through which the glass material is fed is positioned on the base, and also supports the controlling and guiding means for the glass material, together with a flame to render the glass plastic so that the glass winds around the rotating wires held in the head. An elongated bead is thus formed on the electrode supporting wires. The drum is shifted by an automatically operated mechanism and the head rotates in a second flame to mold the glass bead and securely embed the wires in the bead. The drum is then shifted and the bead is allowed to cool before being shifted to the removal position, where the beaded assembly may be removed from the nest. Each successive head follows the same cycle of operations for forming a glass bead on the electrode supporting wires held in the heads, the several operations being performed in succession and the major operations being effected entirely automatically.

The partially completed unit may be positioned in another nest which is adapted to fit into the revolving head of the machine and advanced through the same operating positions to form a similar bead on the other end of the wires to insure the parallel arrangement of the electrodes. Elongated beads of uniform size, equally spaced and properly insulated electrodes, and quantity production are attained at low cost.

One feature of the invention is a mechanism by which the glass bead is automatically shaped by clamping directly succeeding the beading position and while the glass material is still in a plastic state. This mechanism comprises a slidable collar on the revolving head which closes a pair of jaws to clamp the bead to the supporting wires. This collar is operated by a yoke which is pivoted on the drum and has a roller on the end thereof which engages a guide rail on the stationary base.

Another feature is a mechanism by which the feeding of the glass material at the beading position is automatically controlled. This mechanism comprises a series of levers cooperating through a cam on the master drive to regulate the plastic material supplied to the electrode wires.

A further feature of the invention comprises individual trains of gears at each of the major operating positions to rotate the successive heads when at these positions. This arrangement consists of suitable driven gears having associated therewith resiliently supported idlers which automatically mesh with the individual drive gears when they approach the main operating positions.

A more detailed description of the invention follows and is illustrated in the accompanying drawings in which:

Fig. 1 illustrates in perspective, an assembly of a glass working machine embodying all the features of this invention with two of the major operating positions fully equipped;

Fig. 2 is a plan view, partly in section, to illustrate the driving mechanism;

Fig. 3 is an elevation partly in section to show the complete driving mechanism;

Fig. 4 is a side elevation of the machine to illustrate the master drive controlling mechanism;

Fig. 5 is an enlarged detailed view of the beading mechanism;

Fig. 6 is an enlarged view of the head and yoke assembly;

Fig. 7 illustrates one of the nests for receiving the electrode structure;

Fig. 8 is a view of another nest to receive the electrode assembly after the formation of the bead shown in Fig. 7; and, Fig. 9 shows the completed electrode assembly unit with both beads maintaining the electrodes and supporting wires in parallel position.

*Constructional description.*—In the embodiment of the invention illustrated in the drawings there is a circularly arranged series of heads mounted on the periphery of a drum or carrier which is intermittently rotated to bring each head successively into the positions where the various operations incident to the forming of the glass beads on the electrode supporting wires are performed. Referring to Fig. 1, the carrier or drum for supporting the heads consists of a central hub 10 having a dome-shaped body member 11 and an overhanging cylindrical band 12 on the periphery of the body member. A vertical shaft 13 projects through the hub 10 of the drum and is provided with a bushing 14 to form a snug fit between the shaft and the drum, which are rigidly connected together by means of a transverse pin 15. The shaft 13 also carries a five position metallic spider 16 which is rigidly attached to the shaft directly below the hub 10 of the drum. The shaft 13 is journaled in a vertical housing supported by the stationary base or table 17 and comprises a cylindrical housing 18 supported above the table and a cup-shaped housing 19 below the table. A series of circularly arranged bearings 20 are formed integral with the body member 11 and have their axes parallel with the axis of the shaft 13. These bearings project on either side of the body member 11 and receive the vertical shaft 21 which has a shoulder 22, engaging the upper surface of the bearing 20, and a collar 23, which engages the lower surface of the bearing. A beveled gear 24 is carried at the upper end of the shaft 21 and a spur gear 25 is affixed to the lower end of the shaft. A metallic mounting 26, is rigidly attached to the overhanging edge 12 of the drum, in alinement with and parallel to vertical shaft 21, and carries a horizontally arranged bearing 27 at the upper end thereof, its axis being radially arranged with respect to the axis of the drum. A cylindrical chuck or head 28, extends through the bearing 27 and is provided at its inner end with a beveled gear 29, which engages the beveled gear 24 on the vertical shaft 21. The outer end of the head 28 is provided with oppositely disposed bifurcated arms 30, in which are pivoted clamping arms 31. A cylindrical slidable collar 32 surrounds the head 28 directly behind the arms 31 and is provided with a circular flange ring 33 which is joined to the clamping arms 31 by means of links 34. A removable metal surface 35, preferably of polished steel, is attached to the free end of each clamping arm 31, to prevent sticking of the glass material when the arms 31 compress the bead on the electrode supporting wires. A trunnion 36 formed on the mounting 26, at the lower end thereof, carries a lever member 37, having a yoke 38, at its upper end which loosely engages the flange ring 33 on the slidable collar 32. A spring 39 connected to the lever 37 and the mounting 26, is provided to return the lever member to its normal position after being shifted. A roller bearing 40 is carried at the lower end of the arm 37. The forward end of the chuck or head 28 is adapted to receive a nest or die 41 which carries the electrode assembly unit on which the insulating bead is to be formed.

As shown in Fig. 2, there are five operating positions and the heads are brought successiveley into these positions by the intermittent counter-clockwise rotation of the drum, the drum remaining at rest for an interval of time between each partial revolution. The driving mechanism for obtaining the intermittent rotation of the drum comprises a motor 42, attached to the bottom of the journal housing 19, which drives gear 43 attached to a primary driving shaft 44 supported horizontally by bearing 45 extending from the journal housing 19, and bearing 46 on the shaft hanger frame 47 attached to the lower surface of the table 17. A spur gear 48 is keyed to the shaft 44, adjacent the bearing 46, and furnishes driving means for the large master driving gear 49. This gear is affixed to the shaft 50, journaled in a bearing 51 at the lower end of the hanger frame 47, and bearing 52 at the lower end of hanger frame 53 at the opposite side of the table 17. The shaft 50 carries a beveled gear 54 which engages a pinion gear 55 carried by a vertical shaft 56 which rides in a bearing 57 extending from the hanger frame 53 and an upper bearing 58, extending through the table 17. Attached to the upper end of the shaft 56 is a gear 59 having a portion of the teeth removed to form a discontinuous driving surface for the associate gear 60 attached to a vertical shaft 61. This shaft also carries a cam 62 and a radial arm 63 having a vertical pin 64 on the end thereof. In the operation of this driving mechanism the gear 59 rotates in a counter-clockwise direction and drives its associate gear 60 in a clockwise direction so that, for approximately two-thirds of a revolution of the gear 59, the gear 60 rotates through a complete revolution, to advance the pin 64 into one of the slots 65 of the spider member 16 and rotate the spider one-fifth of a revolution. The cam 62 engages a convex surface 66 between adjacent slots 65 on spider member 16 during a portion of the rotation of the gear 60 and also for an interval of time when the gear 60 is disengaged, to hold the drum in a stationary position.

The primary drive shaft 44 also carries a beveled gear 67, rigidly attached thereto adjacent one side of the bearing 45, which gear engages an associated pinion gear 68 attached to the lower end of a stub shaft 69 extending through the table 17. This stub shaft also carries a gear 70, which engages a chain drive 71, to rotate planetary gears 72 and 73 attached to the lower ends of shafts 74 and 75, respectively. A yoke and roller assembly 76, attached to a spring anchored to the table 17, engages the chain drive 71, to form an automatic take-up for the chain. The shafts 74 and 75, extend vertically through the base of the table 17 and carry driving gears 77 and 78 respectively, at their upper ends. Associated with each of these driving gears is a driven gear 79 which is supported through a movable bearing 80 attached to the journal housing 81 carried by the base of the table 17. Each of these movable bearings carries a downwardly extending pin 82 having a tension spring 83 attached thereto. The other end of the spring 83 is attached to a rigid pin 84, which in turn is attached to the upper surface of the table 17. A downwardly extending arm 85 attached to the movable bearing 80 engages a stop 86 carried by the journal housing 81 to prevent excessive arc movement of the driven gear 79 rotating in the movable bearing 80. These independent sets of gears at the two major operating positions provide efficient driving mechanisms to rotate the heads 28 individually in each of these positions. Furthermore, the self-alining feature of the driven gears 79 provides positive engagement of the gear set and reduction of wear on these moving parts.

Assuming that the rotating heads on the drum are in the positions shown in Fig. 1, the rear left-hand head will be designated position 1, or the filling position. Since the drum 11 rotates in a counter-clockwise direction, the forward left-hand head will be designated position 2, or the beading position. The other three positions following around the periphery of the drum will be designated position 3, position 4 and position 5.

Adjacent to the beading position and rigidly attached to the top of the table 17 is a standard comprising a cylindrical vertical post 87 supported in an angular corner base member 88 which in turn is attached to but offset from the corner of the table adjacent the beading position. A cylindrical adjustable collar 89 fits on the post 87 and is adjusted in position and rigidly held by means of a locking stud 90. An angular extension 91 on the collar supports a metallic block 92, having a downwardly extending aperture to receive a tubular chute or channel 93 which can be adjusted at an angle by the movement of the block 92, so that the lower end of the chute is adjacent the wires held in the nest 41 projecting from the head 28. A slot 94 is cut in the tubular chute 93, intermediate the lower end thereof and the supporting block 92, and a lever or bar 95 engages the slot 94. This bar is pivoted to an angular extension 96 on the collar 89, at right angles to and in a lower plane than the extension 91 and the free end thereof carries a ring 97 (Fig. 5) which is attached to a downwardly extending wire 98 having its lower end connected to a pivoted arm 99 (Fig. 4) carried by a longitudinal strap 100 joining two legs of the table 17. Intermediate the ends of the pivoted arm 99 is an upwardly extending projection 101, having a pin 102 (Fig. 1) extending at right angles to the projection 101 and bearing against the lower surface of a curved lever 103 pivoted in a socket 104 extending from one of the legs of the table 17. A resilient spring 105 anchored to one of the legs of the table is connected to the pivoted arm 99 and maintains the engagement of the pin 102 with the lever 103. The free end of the lever 103 is in alinement with a semi-circular eccentric cam rail 106 having its ends attached to diametrically opposed spokes of the master driving gear 49. This arrangement provides an automatic control of the feeding of the vitreous material 107, such as a glass cane, which slides through the tubular chute 93 and is engaged by the lever 95 in the slot 94. A metallic collar 108, similar to the collar 89, is also adjustably mounted on the post 87, by means of a locking stud 109, and carries an angular extension 110 parallel with the extension 91 on the collar 89. The extension 110 supports a metallic block 111 having a slidably adjustable outward extending arm 112, to which is pivoted an angular guide member 113. The guide member 113 extends at a downward angle toward the lower end of the tubular chute 93 and is provided with a tapered groove 114 at its lower end which arrests the travel of the glass cane 107. An adjusting screw 115 extending through the upper end of the guide member 113, is threaded in the arm 112. This arrangement forms an adjustable guide member to direct and proportion the length of the glass cane extending from the tubular chute 93. A strap 116 attached to the side of the angular base 88, supports a pipe line 117 which carries the glass blower's twin burner 118, the opposed ends of which are located on either side of the electrode assembly unit held in the nest, and the glass cane projecting from the chute 93. An offset rail 119 attached to the edge of the table 17 constitutes a shifting means for the yoke lever 37, in the course of its travel from position 2 to position 3, whereby the movable jaws 31 are operated to compress the glass bead while it is still in a plastic state.

At position 3, or the finishing position, there is a glass blower's twin burner 120 connected to a pipe line 121 attached to the table by strap 122 and connected to the common supply line 123. In this position the glass bead is molded to remove the sharp edges incident to the clamping operation and to firmly embed the wires in the glass bead. In position 4 the head 28 is idle and the glass bead is allowed to cool, after which the drum moves to position 5 and the complete assembly may be removed.

The apparatus shown is intended for use in the manufacture of small electrode units, such as is shown in Fig. 9, in which the hair pin wire 124 forms the two leading-in wires for the cathode or filament of the discharge device, the wire 125 forms a helical grid electrode, and the remaining wire 126 is welded to a cylindrical plate 127, which forms the anode of the device. However, other types of electrode structures may be adapted to the machine by changing the nests so that a bead may be formed on the supporting wires for the electrodes. Glass beads 128, and 129 are formed at opposite ends of the wires to insure the parallel arrangement of the wires. The elongated beads are efficiently formed on the electrode wires by a series of operations which are performed automatically by the machine constructed in accordance with this invention.

*Operation.*—Having now described in detail the construction of a preferred type of machine, its operation in the forming of insulating beads on the electrode supporting assembly unit for electron discharge devices will now be explained.

The preliminary operation consists of inserting the various electrodes and supporting wires in their proper relationship in the nest 41, shown in Fig. 7, which is provided with sleeves and grooves to accommodate the configuration of the various electrodes. A supply of these nests may be provided and placed in position 1, so that as the drum is intermittently rotated on the table, each of the nests 41 can be inserted in the heads 28 as they come to a stop in this position. Similarly the nest 41 may be rigidly held in the head 28 and as the head reaches position 1 the electrodes may be inserted therein. The same procedure may be carried out with respect to forming the bead on the other end of the supporting wires by changing the nests in the heads 28.

The operation of the machine is best understood by following one operating head through a complete cycle of operations, since all of the heads follow the same course sequentially.

Assuming that the radial heads are in the positions shown in Fig. 1, the driving mechanism is started by means of the motor 42 and the gear 67 on the primary driving shaft 44 drives the planetary gears coupled together by the chain drive 71. The spur gear 48 drives the master gear 49 to rotate the segmented gear 59 in a counter-clockwise direction through the medium of cooperating gears 54 and 55. For a certain interval of time the drum will be idle, since the driving gear 59 will not engage the teeth on the gear 60. The head 28 in position 1 is also idle, since there is no driving force for the drive shaft 21 in this position, and one of the nests 41 supporting the electrode assembly unit may be inserted in the head 28. The teeth of the gear 59 engage the gear 60, to rotate the shaft 61 with its associate cam 62, arm 63 and pin 64, one complete revolution to approximately two-thirds of a revolution of gear 59. During the revolution of the shaft 61, the pin 64 moves into the slot 65 of the spider member 16 and rotates the spider 16, shaft 13 and the drum which is carried thereby. The head in position 1 is moved approximately one-fifth of a revolution to position 2, and the succeeding head is now in position 1 to receive another assembly nest 41. When the head 28 enters position 2, the spur gear 25, on the lower end of the shaft 21, engages the resiliently supported driven gear 79, which automatically meshes with the gear 25 by means of the swinging action of its mounting and the tension spring 83. The vertical driving shaft 21 is rotated in this position and the pinion gear 21 engaging the beveled gear 29 on the head 28 rotates the head in the flame of the twin burner 118. During this time the master driving gear 49 has traveled through a half revolution so that the cam rail 106 engages the lever 103, to force the arm 99 downward and thereby raise the pivoted bar 95 on the standard to release the glass cane 107 which slides down the chute 93, by gravity, until it strikes the tapered groove 114 in the guide member 113. The twin burner 118 melts the end of the glass cane which projects from the chute, and the plastic glass flows on the wires held in the head 28 and tends to wind around the wires until the pivoted bar 95 engages the glass cane 107 in the chute 93. The eccentric arrangement of the cam 106, regulates the supply of glass descending through the chute so that when the desired size of bead is formed on the wires the plastic glass is a relatively thin thread which is easily severed when the head 28 is shifted to the succeeding position. These various operations are performed in position 2 in the interval determined by the smooth edge of the gear 59, since gear 60 is idle during this interval. However, as soon as the teeth of gear 59 engage the gear 60 the drum will again be rotated and the head in position 2 will be shifted to position 3, in the same manner as described in connection with the operation of the drum from position 1 to position 2. The plastic glass is automatically severed at the edge of the guide member 113 when the drum and head are shifted from position 2.

When the head 28 attached to the drum travels from position 2 to position 3, the roller bearing 40 on the pivoted lever 37 strikes the guide rail 119 attached to the table and the rotation of the drum forces the lower end of the lever 37 inwardly and the yoke 38 outwardly, to slide the collar 32 forward. The sliding collar 32 actuates the jaws 31 which are closed for an instant on the plastic glass wound on the wires in the nest, and compress the glass while in its plastic state, to form an elongated bead on the supporting wires. The travel of the roller bearing 40 can be followed by referring to Fig. 2 in which the progress of the roller bearing is shown in dotted line.

When the head 28 enters position 3, the gear 25 engages another resiliently mounted driven gear 79, associated with a supporting gear mechanism, and the meshing of these gears is accomplished in the same manner as described in connection with position 2. In this position the head 28 is rotated in the flame of the twin burner 120, to mold the glass on the wires and remove any sharp edges that were formed incident to the clamping operation of the arms 31.

The drum is again shifted by the cooperating action of the gears 59 and 60 and the spider member 16 whereby the spur gear 25 on the vertical shaft 21 is disengaged from the train of gears in position 3 and moves to position 4. In this position the head 28 is idle, and the glass bead is allowed to cool at room temperature, or a suitable cooling means, such as a blast of air, may be provided to rapidly cool the glass bead. The drum is again shifted to position 5, in which the head 28 is again idle and the completed nest may be removed from the head. When the drum is again shifted to position 1, the head 28 is ready to receive another assembly unit and has passed through a complete cycle of operations.

While a single bead provides sufficient insulation between adjacent electrodes, and will suffice for certain types of electrode structures, it is preferable to form a second bead on the opposite ends of the electrode wires, to insure their proper parallel relation. This is accomplished by removing the partially assembled unit from the nest 41, shown in Fig. 7, and inserting the unit in a nest 130, shown in Fig. 8, in which the finished end of the unit assembly is inserted in the nest 130 with the bead 128 seated in a socket in the nest. A longitudinal opening in the nest receives the electrodes with the ends of the wires projecting therefrom. This nest is adapted to be inserted in the heads 28 and advanced through the various positions of the machine to form a similar bead 129 on the ends of the wires.

While in the machine, which has been described, it is intended that certain parts shall be inserted manually, while the movement of other parts is automatically effected during the operation of the machine, it will be understood that, so far as the broader features of the invention are concerned, the manner in which the parts are introduced and the manner in which the movement for handling these parts is effected, is not material and may be varied as found more desirable or economical in adapting the particular apparatus in which the features of this invention are embodied to the conditions in which the apparatus is to operate. Furthermore, the invention is not limited in its application to the particular electrode unit illustrated, since the assembly nests may be modified to receive other types of electrode structures or wire material on which a glass bead may be formed.

What is claimed is:

1. In a glass working machine, a rotatable member, a normally inactive head mounted on the periphery thereof and adapted to carry metallic elements which project from said head, a standard supported adjacent the periphery of said rotatable member and adapted to hold vitreous material, a burner adjacent said standard, means to shift said rotatable member to bring said head in operative relationship to said standard, and means to rotate said head to apply said vitreous material to said metallic elements.

2. In a glass working machine, a rotatable member, a normally inactive head mounted on the periphery thereof, a standard supported adjacent the periphery of said rotatable member, a tubular channel supported by said standard and adapted to hold glass material, controlling and guiding means for said glass material adjacent said channel, and means to rotate said head while adjacent said standard and in operative relationship with said glass material.

3. In a glass working machine, a rotatable member, a normally inactive head mounted on the periphery thereof, a standard supported adjacent the periphery of said rotatable member, a tubular channel supported by said standard adapted to feed glass material, controlling and guiding means for said glass material supported by said standard adjacent said channel, and means to rotate said head while adjacent said standard and in operative relationship with said glass material.

4. In a glass working machine, a rotatable member, a normally inactive head mounted on the periphery thereof and adapted to carry metallic elements projecting from said head, a standard supported adjacent the periphery of said rotatable member, means including a tubular channel supported by said standard adapted to hold plastic glass material, means to rotate said head to cause the rotation of said elements in said plastic material, and means on said head to compress said plastic material on said elements.

5. In a glass working machine, a stationary base, a rotatable member thereon, a normally inactive head on said rotatable member adapted to carry metallic elements, a standard supported on said base adjacent the periphery of said rotatable member, said standard adapted to hold plastic glass material, means to rotate said head in order to revolve said elements in said glass material, a guide rail on said base, and means on said drum engaging said rail to compress said glass material.

6. In a glass working machine, a rotatable member, a normally inactive head mounted on the periphery thereof, a nest held in said head adapted to carry metallic elements which project therefrom, a standard supported adjacent the periphery of said rotatable member, a tubular channel supported by said standard adapted to feed plastic glass material therefrom, means to rotate said head in order to revolve said elements in said plastic material, a slidable collar on said head, a pair of jaws pivoted on said head and operated by said collar, and a yoke member operating said collar to compress said jaws.

7. In a glass working machine, a stationary base, a rotatable member thereon, a normally inactive head mounted on the periphery thereof adapted to carry metallic elements in the end thereof, a standard rigidly mounted on said base adjacent the periphery of said rotatable member adapted to hold vitreous material, means to rotate said head in order to revolve said elements in said vitreous material, a guide rail on said base, and a yoke member having movable jaws pivotally mounted on said drum, one end of said yoke member adapted to strike said guide rail to actuate said jaws to compress said glass material.

8. In a glass working machine, an intermittently rotatable drum, a head mounted horizontally on the periphery thereof, driving means comprising a master drive for said drum, a standard supported adjacent the periphery of said drum adapted to support vitreous material, and means operated by said master drive for controlling the supply of said material.

9. In a glass working machine, an intermittently rotatable drum, a head mounted horizontally on the periphery thereof, driving means comprising a master drive for said drum, a standard supported adjacent the periphery of said drum, an inclined chute on said standard, for supporting a glass cane, a control bar adapted to engage said glass cane, and means operated by said master drive to regulate the pressure of said control bar.

10. In a glass working machine, an intermittently rotatable drum, a head mounted horizontally on the periphery thereof, driving means comprising a master drive for said drum, a projection on said master drive, a standard supported adjacent the periphery of said drum, a tubular chute on said standard adapted to hold a glass cane, a control bar adapted to engage said glass cane, and a series of levers connected to said control bar and operated by said projection on said master drive.

11. In a glass working machine, an intermittently rotatable drum, a head mounted horizontally on the periphery thereof, driving means comprising a master drive for said drum, a standard supported adjacent the periphery of said drum, a tubular chute supported on said standard for carrying a glass cane, a control bar adapted to engage said glass cane, a lever connected to said control bar, and a semicircular eccentric rail on said master drive controlling said lever.

12. In combination, a stationary base, a metallic drum on said base, a series of stationary operating positions on said base distributed around said drum, one of said positions comprising a standard supporting a gravity feed member adapted to feed glass material therefrom, a plurality of heads on the periphery of said drum, each head being in line with an operating position, said heads adapted to carry wire material, means to rotate said drum, means to rotate said heads, and means to fuse said glass material on said wire material.

13. In combination, a stationary base, a metallic drum on said base, a series of stationary operating positions on said base distributed around said drum, one of said positions comprising a standard supporting a gravity feed member adapted to feed glass material therefrom, a plurality of heads on the periphery of said drum, each head being in line with an operating position, one of said heads adapted to carry a supporting wire assembly, means to rotate said drum, means to rotate said heads, means to fuse said glass material on said wire assembly, and means automatically operated by said base directly following said fusing means to compress said material on said wire assembly.

14. In a glass working machine, an automatic feed for glass material comprising a sloping channel support for the glass material, a control bar engaging said glass material, driving means for said machine including a master drive, and means operated by said master drive to regulate said control bar.

15. In a glass working machine an automatic feed according to the preceding claim and having an eccentrically arranged cam on said master drive which engages the means to regulate said control bar.

16. In a power driven machine the combination comprising a driven pinion, an intermittently idle drive, and a flexibly held intermediate member engaging said pinion and drive to transmit driving force to said idle drive.

17. In a power driven machine the combination comprising an intermittently idle drive, a driven pinion, and a flexibly held idler pinion intermittently engaging said driven pinion and said idle drive.

In witness whereof, we hereunto subscribe our names this 26th day of August, A. D., 1926.

PAUL SCHWERIN.
JOHN G. PFEIFFER.